(12) United States Patent
Frankel et al.

(10) Patent No.: US 10,171,169 B2
(45) Date of Patent: Jan. 1, 2019

(54) SOFTWARE PROGRAMMABLE FLEXIBLE AND DYNAMIC OPTICAL TRANSCEIVERS

(71) Applicant: Ciena Corporation, Hanover, MD (US)

(72) Inventors: Michael Y. Frankel, Bethesda, MD (US); Stephen B. Alexander, Annapolis, MD (US)

(73) Assignee: Ciena Corporation, Hanover, MD (US)

( * ) Notice: Subject to any disclaimer, the term of this patent is extended or adjusted under 35 U.S.C. 154(b) by 34 days.

(21) Appl. No.: 15/175,118

(22) Filed: Jun. 7, 2016

(65) Prior Publication Data

US 2017/0353246 A1 Dec. 7, 2017

(51) Int. Cl.
| | | |
|---|---|---|
| *H04B 10/032* | (2013.01) | |
| *H04B 10/40* | (2013.01) | |
| *H04B 10/80* | (2013.01) | |
| *H04B 10/61* | (2013.01) | |

(52) U.S. Cl.
CPC .................................. *H04B 10/40* (2013.01)

(58) Field of Classification Search
USPC .................................................. 398/135, 136
See application file for complete search history.

(56) References Cited

U.S. PATENT DOCUMENTS

| | | | |
|---|---|---|---|
| 7,343,101 B1 | 3/2008 | Frankel et al. | |
| 7,733,999 B2 | 6/2010 | Mateosky et al. | |
| 7,822,958 B1* | 10/2010 | Allen ................... | G06F 9/4401 326/41 |
| 7,839,222 B2 | 11/2010 | Barrow et al. | |
| 7,920,796 B2 | 4/2011 | Brownlee et al. | |
| 8,045,863 B2 | 10/2011 | Meagher et al. | |
| 8,750,713 B2 | 6/2014 | Sheth et al. | |
| 8,805,195 B2 | 8/2014 | Mateosky et al. | |
| 8,884,649 B1 | 11/2014 | Mateosky et al. | |
| 2007/0283311 A1* | 12/2007 | Karoubalis ......... | G06F 17/5054 326/38 |

(Continued)

OTHER PUBLICATIONS

Atul Srivastava, Optical Integration and the Role of DSF Coherent Optics Modules, CTO, NTT Electronics—America, Market Watch OFC 2014, pp. 1-24, NTT Electronics Corp., 2013.

(Continued)

*Primary Examiner* — Oommen Jacob
(74) *Attorney, Agent, or Firm* — Clements Bernard Walker PLLC; Christopher L. Bernard; Lawrence A. Baratta, Jr.

(57) ABSTRACT

A software programmable optical transceiver includes one or more Field Programmable Gate Arrays (FPGAs); and an electro-optical front end communicatively coupled to the one or more FPGAs, wherein the electro-optical front end comprises a transmitter and a receiver, wherein the transmitter is adapted to transmit a transmit signal from the one or more FPGAs and the receiver is adapted to receive a receive signal and provide to the one or more FPGAs, wherein one or more applications are utilized to dynamically configure the one or more FPGAs for digital functionality to operate the software programmable optical transceiver in an associated mode. The one or more applications are loaded as needed to configure the software programmable optical transceiver in the associated mode, without requiring pre-programmed hardware in the software programmable optical transceiver for operation in a plurality of operating modes.

19 Claims, 3 Drawing Sheets

(56) References Cited

U.S. PATENT DOCUMENTS

| | | | | |
|---|---|---|---|---|
| 2008/0123779 | A1* | 5/2008 | Norris | H04L 27/0012 |
| | | | | 375/326 |
| 2009/0245790 | A1* | 10/2009 | Mizutani | H04J 3/0682 |
| | | | | 398/43 |
| 2009/0316925 | A1* | 12/2009 | Eisenfeld | A61B 7/008 |
| | | | | 381/67 |
| 2010/0178065 | A1* | 7/2010 | Nishihara | H04B 10/61 |
| | | | | 398/202 |
| 2013/0051809 | A1* | 2/2013 | Mehrvar | H04B 10/032 |
| | | | | 398/208 |
| 2014/0312931 | A1 | 10/2014 | Mateosky et al. | |
| 2014/0341595 | A1 | 11/2014 | Harley et al. | |
| 2015/0091003 | A1* | 4/2015 | Kurokawa | H01L 27/1225 |
| | | | | 257/43 |
| 2015/0365177 | A1* | 12/2015 | Blumenthal | H04B 10/40 |
| | | | | 398/9 |
| 2016/0087845 | A1* | 3/2016 | Kaneriya | H04L 49/351 |
| | | | | 370/254 |
| 2017/0111107 | A1* | 4/2017 | Yamane | H04B 10/03 |

OTHER PUBLICATIONS

K. Nordin et al., Coherent Optical Communication Systems in Digital Signal Processing, International Journal of Advanced Engineering Research and Technology (IJAERT), vol. 2 Issue 7, Oct. 2014, ISSN No. 2348-8190, pp. 228-232.

Norman L. Swenson, ClariPhy, Signal Processing ASICs for Optical Fiber Communications, Advanced Photonics for Communications Jul. 14, 2014, Advanced Photonics Plenary Session, 2014, ClariPhy Communications, Inc.

ViaSat., DSP IP Cores Optical Communications, ViaSar DSP cores increase optical channel throughput for 400G optical communications and beyond, 2011-2015 ViaSat, Inc.

Ciena, Enabling a Bigger and Smarter Network With Ciena's Wavelogic 3, pp. 1-5, 2013 Ciena Corporation.

* cited by examiner

SOFTWARE PROGRAMMABLE FLEXIBLE AND DYNAMIC OPTICAL TRANSCEIVERS

FIELD OF THE DISCLOSURE

The present disclosure generally relates to optical networking systems and methods. More particularly, the present disclosure relates to software programmable flexible and dynamic optical transceivers based on Field Programmable Gate Arrays (FPGAs).

BACKGROUND OF THE DISCLOSURE

Conventional optical transceivers, transponders, and modems (collectively referred to herein as "transceivers") for coherent optical transmission have a vast amount of digital functionality that is implemented in hard-coded, pre-programmed Application Specific Integrated Circuits (ASICs). The digital functionality can include, without limitation, modulation formats, dispersion compensation, Polarization Mode Dispersion (PMD) compensation, non-linear pre and/or post-compensation, Forward Error Correction (FEC), performance monitoring, and the like. An example of an optical transceiver with the digital functionality is Ciena Corporation's WaveLogic which supports a fully instrumented, intelligent photonic system with coherent optics and flexible line elements that combine with embedded and discrete software tools to offer superior automation, control, and visibility of optical networks. The associated ASICs are built to efficiently address any metro, regional, long-haul, or submarine application. Due to the large Non-Recurring Engineering (NRE) cost, generally low volumes (for networking applications relative to other applications with higher volumes such as consumer devices, etc.), and short product lifecycle, convention approaches have ASIC-based devices hard-coded, pre-programmed to support multiple modes, such as for any metro, regional, long-haul, or submarine application. As described herein, a mode is some digital functionality implemented in the optical transceiver. Thus, any transceiver used in one application would have all the functionality for the other applications, albeit disabled. Having multiple modes included therein takes up gates, power, and real estate on a Complementary Metal Oxide Semiconductor (CMOS) die. This contributes to a large size and extremely expensive masks. Additionally, hard-coded, pre-programmed implementations may be difficult to adapt to flexible, dynamic Software Defined Networking (SDN) networks. Further, hard-coded, pre-programmed implementations preclude future compatibility with the industry's definitions of interoperable and open transceiver interfaces.

Thus, it would be advantageous to support software programmable flexible and dynamic optical transceivers based on Field Programmable Gate Arrays (FPGAs) to overcome the aforementioned limitations in the hard-coded, pre-programmed implementations.

BRIEF SUMMARY OF THE DISCLOSURE

In an exemplary embodiment, a software programmable optical transceiver includes one or more Field Programmable Gate Arrays (FPGAs); and an electro-optical front end communicatively coupled to the one or more FPGAs, wherein the electro-optical front end includes a transmitter and a receiver, wherein the transmitter is adapted to transmit a transmit signal from the one or more FPGAs and the receiver is adapted to receive a receive signal and provide the receive signal to the one or more FPGAs, wherein one or more applications are utilized to dynamically configure the one or more FPGAs for digital functionality to operate the software programmable optical transceiver in an associated mode. The one or more applications can be loaded as needed to configure the software programmable optical transceiver in the associated mode, without requiring pre-programmed hardware in the software programmable optical transceiver for operation in a plurality of operating modes. The one or more applications can be FPGA bit files adapted to configure the one or more FPGAs. The one or more applications can be loaded from one of a local memory in the software programmable optical transceiver and remote storage communicatively coupled to the software programmable optical transceiver. The one or more applications in the local memory can be for one or more of frequently used functionality and a requirement of low latency for fast startup, and wherein the one or more applications in the remote storage can be for one or more of infrequently used functionality and tolerance to loading delays.

When the software programmable optical transceiver is in a startup mode, the one or more applications can include data capture, automatic baud rate and modulation format identification, and identification of channel operating parameters, and, subsequent to the startup mode, the one or more applications can include an appropriate application for modulation and the channel operating parameters, based on the automatic baud rate and modulation format identification and the identification of channel operating parameters. The associated mode can be based on an associated application including one of Data Center interconnect, metro, regional, long-haul, and submarine. The one or more applications can include a plurality of proprietary applications for single vendor interoperability and a plurality of standards-based applications for multi-vendor interoperability. The one or more FPGAs can be updated with different applications of the one or more applications responsive to a protection switch causing different operating conditions. The software programmable optical transceiver can further include, between the one or more FPGAs and the electro-optical front end: a digital-to-analog converter (DAC) adapted to receive digitally the transmit signal from the one or more FPGAs; and an analog-to-digital converter (ADC) adapted to transmit digitally the receive signal to the one or more FPGAs. The DAC and the ADC can be integrated with the one or more FPGAs via interposers and low power digital interfaces. The one or more applications can be loaded to the one or more FPGAs through based on control through one or more of a control plane and a Software Defined Network (SDN) controller. The electro-optical front end can utilize coherent modulation and demodulation, and the one or more applications can support the digital functionality associated with the coherent modulation and demodulation. The one or more applications can support the digital functionality associated with optical signal compensation including one or more of Forward Error Correction (FEC), dispersion compensation, Polarization Mode Dispersion (PMD), and non-linear effect compensation.

In another exemplary embodiment, a software programmable optical transceiver includes an electro-optical front end for conversion between an optical domain and an electrical domain; a digital-to-analog converter (DAC) and an analog-to-digital converter (ADC) for conversion between analog electrical signals and digital electrical signal; and one or more Field Programmable Gate Arrays (FPGAs) for digital signal processing functions, wherein one or more applications are utilized to dynamically configure the one or more FPGAs for the digital signal processing functions to operate the software programmable optical transceiver in an associated mode. The one or more applications can be loaded as needed to configure the software programmable optical transceiver in the associated mode, without requiring pre-programmed hardware in the software programmable optical transceiver for operation in a plurality of operating modes. When the software programmable optical transceiver is in a startup mode, the one or more applications can include data capture, automatic baud rate and modulation format identification, and identification of channel operating parameters, and, subsequent to the startup mode, the one or more applications an include an appropriate application for modulation and the channel operating parameters, based on the automatic baud rate and modulation format identification and the identification of channel operating parameters.

In a further exemplary embodiment, a method implemented through a software programmable optical transceiver including one or more Field Programmable Gate Arrays (FPGAs) includes, responsive to a startup mode, loading one or more applications including data capture, automatic baud rate and modulation format identification, and identification of channel operating parameters into the one or more FPGAs; and, subsequent to the startup mode, loading appropriate applications into the one or more FPGAs for modulation and the channel operating parameters, based on the automatic baud rate and modulation format identification and the identification of channel operating parameters. The one or more applications can be loaded as needed to configure the software programmable optical transceiver in the associated mode, without requiring pre-programmed hardware in the software programmable optical transceiver for operation in a plurality of operating modes. When the software programmable optical transceiver is in the startup mode, the one or more applications can include data capture, automatic baud rate and modulation format identification, and identification of channel operating parameters, and, subsequent to the startup mode, the appropriate applications can include applications for modulation and the channel operating parameters, based on the automatic baud rate and modulation format identification and the identification of channel operating parameters.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to software programmable flexible and dynamic optical transceivers based on Field Programmable Gate Arrays (FPGAs). Advantageously, the optical transceivers enable a software-defined, flexible, dynamic fiber-optic network through pre-developed single-function, highly optimized Digital Signal Processing (DSP) processing blocks and applications (referred to herein DSP apps which can be FPGA bit files), combined with control plane software for controlling app storage and appropriated automated deployment. A key aspect includes replacing custom, hard-coded, pre-programmed ASIC implementations with FPGAs that are loaded with appropriate apps (bit files) as needed for specific applications, not a single ASIC with multiple modes. This achieves lower development costs as compared with ASIC implementations, the ability to sustain flexible, dynamic network reconfiguration with support for multiple operation modes, and provides ability to support future standards and modes as they are being developed.

Exemplary Optical Network

Figure 1:
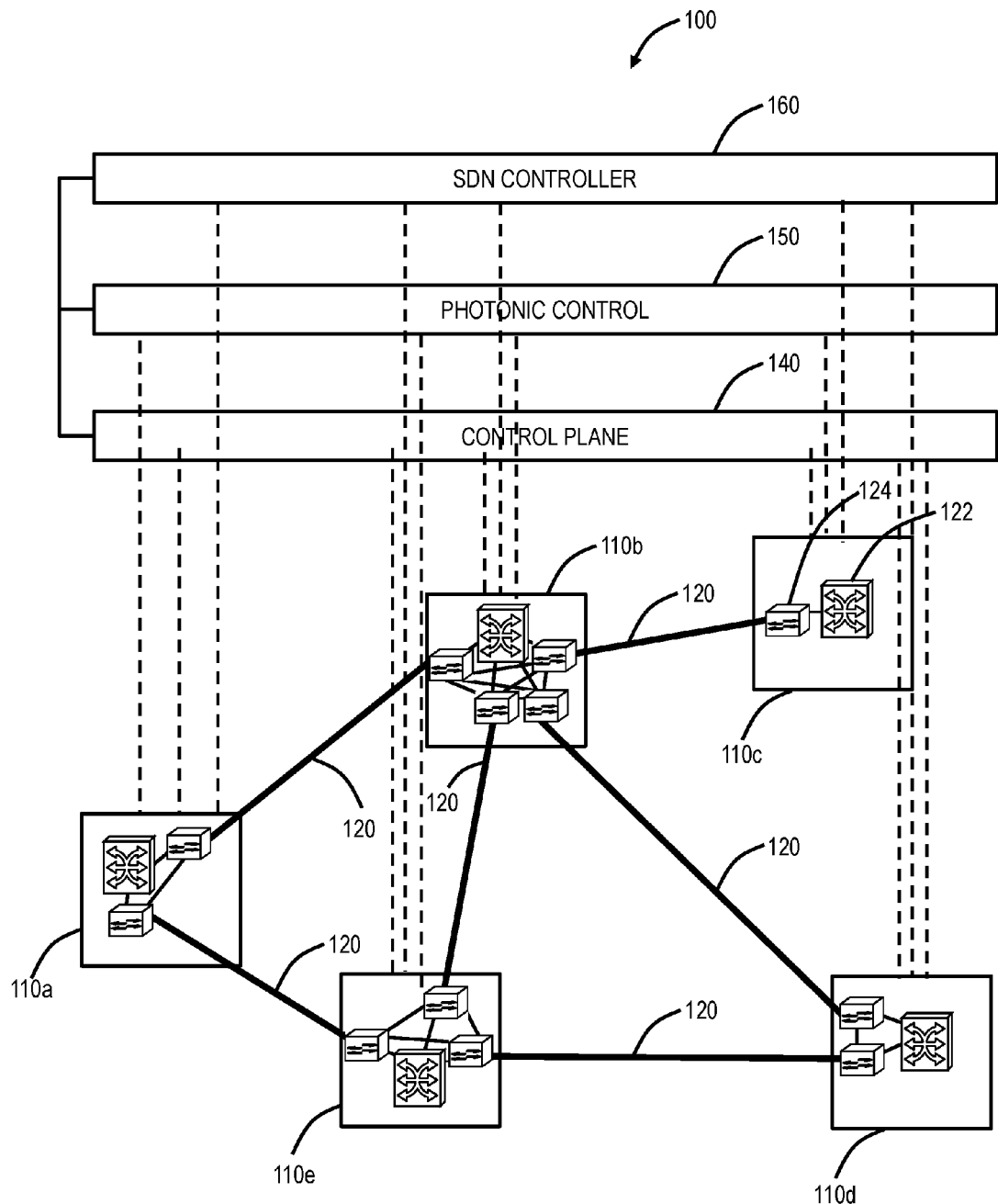
FIG. 1 is a network diagram of an exemplary optical network with five interconnected sites.

Referring to FIG. 1, in an exemplary embodiment, a network diagram illustrates an exemplary optical network 100 with five interconnected sites 110a, 110b, 110c, 110d, 110e. The sites 110 are interconnected by a plurality of links 120. Each of the sites 110 can include a switch 122 and one or more WDM network elements 124. The switch 122 is configured to provide services at Layers 1 (e.g., Optical Transport Network (OTN)) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in the same network element. The photonic layer and the photonic control operating thereon can also include intermediate amplifiers and/or regenerators on the links 120 which are omitted for illustration purposes. The optical network 100 is illustrated, for example, as an interconnected mesh network, and those of ordinary skill in the art will recognize the network 100 can include other architectures, with additional sites 110 or with fewer nodes sites, with additional network elements and hardware, etc. The optical network 100 is presented herein as an exemplary embodiment for hosting the software programmable flexible and dynamic optical transceivers based on FPGAs. Those of ordinary skill in the art will recognize the software programmable flexible and dynamic optical transceivers can be used in any optical networking scenario such as data center, metro, regional, long-haul, or submarine application.

The sites 110 communicate with one another optically over the links 120. The sites 110 can be network elements which include a plurality of ingress and egress ports forming the links 120. Further, the nodes 110 can include various degrees, i.e. the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 140 can utilize any type control plane for controlling the switches 122 and establishing connections. In an exemplary embodiment, the control plane 140 can support DSP app management for centralized/distributed storage and delivery of DSP apps to the dynamic optical transceivers.

The optical network 100 can include photonic control 150 which can be viewed as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, variable optical attenuator (VOA) settings, wavelength selective switch (WSS) parameters, etc. The photonic control 150 can be adapted also to perform network optimization on the links 120. This optimization can also include re-optimization where appropriate. In an exemplary embodiment, the photonic control 150 can adjust the modulation format, baud rate, frequency, wavelength, spectral width, etc. of the dynamic optical transceivers in addition to the aforementioned components at the photonic layer. In an exemplary embodiment, the photonic control 150 can include support for DSP app management for storage and delivery of DSP apps to the dynamic optical transceivers.

The optical network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the optical network 100). Work on SDN calls for the ability to centrally program provisioning of forwarding on the optical network 100 in order for more flexible and precise control over network resources to support new services. The SDN controller 160 is a processing device that has a global view of the optical network 100. Additionally, the SDN controller 160 can include or connect to SDN applications which can utilize the data from the SDN controller 160 for various purposes. In an exemplary embodiment, the SDN applications include DSP app management for centralized storage and delivery of DSP apps to the dynamic optical transceivers.

Figure 2:
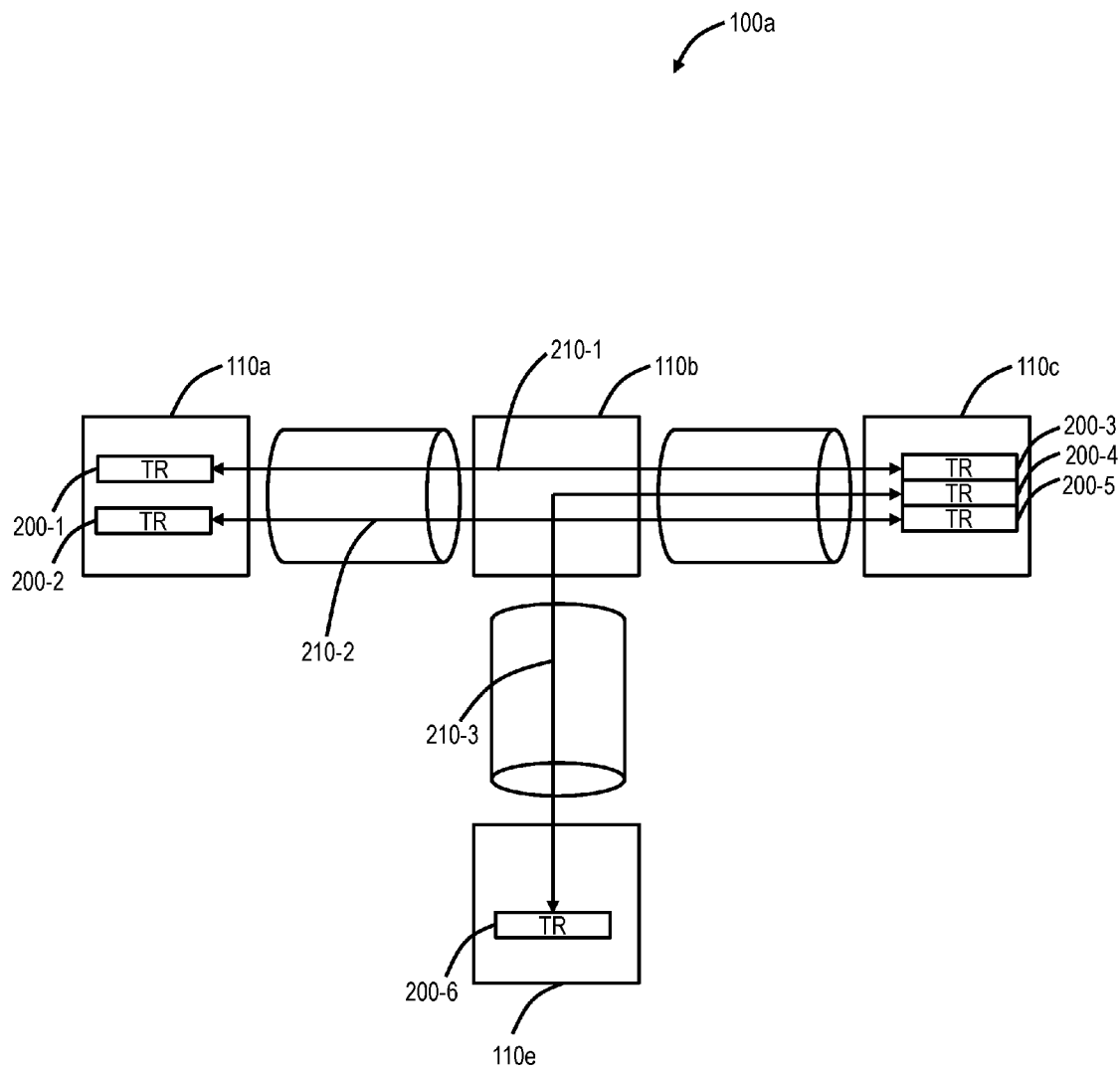
FIG. 2 is a logical network diagram of a subset of the network of FIG. 1 showing the sites and three exemplary wavelengths.

Referring to FIG. 2, in an exemplary embodiment, a logical network diagram illustrates a subset 100a of the network 100 showing the sites 110a, 110b, 110c, 110e and three exemplary wavelengths 210-1, 210-2, 210-3. The wavelengths 210-1, 210-2 are between the sites 110a, 110c with an express through at the site 110b, and the wavelength 210-3 is between the sites 110e, 110c with an express through at the site 110b. The site 110a includes dynamic optical transceivers 200-1, 200-2, the site 110c includes dynamic optical transceivers 200-3, 200-4, 200-5, and the site 110e includes a dynamic optical transceiver 200-6. Thus, the wavelength 210-1 is formed by the dynamic optical transceivers 200-1, 200-3, the wavelength 210-2 is formed by the dynamic optical transceivers 200-2, 200-5, and the wavelength 210-3 is formed by the dynamic optical transceivers 200-6, 200-4. The various wavelengths 210-1, 210-2, 210-3 can carry any type of traffic such as, without limitation, OTN, SONET, SDH, Ethernet, Frame Relay, IP, MPLS, and the like as well of combinations thereof.

The links 120 can include any type of optical fiber. For example, the optical fiber can include a useable optical spectrum of 1530 nm to 1565 nm (C-Band). Of course, other spectrums are contemplated. The optical spectrum can be partitioned into a flexible grid, a fixed grid, gridless, or a combination across the optical spectrum. Thus, each of the links 120 and their associated optical fiber can support a fixed or variable number of wavelengths 210 (wavelengths can also be referred to as optical signals). The wavelengths 210 traverse a channel which carries an underlying service between two of the sites 110 in the network. Each of the wavelengths 210 is formed by the dynamic optical transceivers at two sites 110 where the channel is added/dropped (or regenerated). Since the optical network 100 is an interconnected mesh, the wavelengths 210 may be different on each of the links 120. Parameters associated with each of the wavelengths 210 can include—A-Z path in the network, spectrum allocation (e.g., fixed spectrum, flexible spectrum, amount of spectrum, location on the spectrum, etc.), modulation format, baud rate, FEC parameters, optical power, dispersion compensation, PMD compensation, non-linear compensation, etc.

Evolution of the Optical Network—Interoperability and Back Compatibility

One aspect which is a driver for the dynamic optical transceivers 200 over custom, hard-coded, pre-programmed ASIC implementations is interoperability and backward compatibility issues. The introduction of interoperable transponders is expected to increase the speed with which new transceiver models are introduced into the network. This is contrary to the design paradigm associated with custom, hard-coded, pre-programmed ASIC implementations. Internal company proprietary transceivers are also evolving quite fast, and models from different generations are generally not interoperable. Service providers and the like are pushing towards open transceiver specifications (such as the Open ROADM Multi-Source Agreement (MSA) which further requires interoperability and backward compatibility.

Flexible SDN programmable networks with Colorless/Directionless/Contentionless (CDC) ROADMs further assume that transceivers deployed throughout the network are interoperable. When origin or termination points change, transceivers at both ends have to match. Otherwise, the whole premise for dynamically reconfigurable networks falls apart. This is yet another driver for the dynamic optical transceivers 200. If a flexible SDN programmable network is deployed and operationalized, it effectively blocks the introduction of new higher performance, lower cost and power transceivers as they generally cannot interoperate with older ones.

Evolution of the Optical Network—Sliceable, Bandwidth Variable Transceivers

Also, bandwidth variable transceivers are considered an essential component of next generation networks. They provide the flexibility of capacity optimized for specific reach, and of spectrum utilization optimized for a specific use pattern. ASIC-based transceivers have to build in support for all possible modes of operation, including changing Baud rate and changing bit rate. Chromatic dispersion filter depth increases as the product of Baud rate and bit rate. Thus, if either one is reduced, substantial savings in DSP complexity can be realized. Similarly, large constellation sizes (such as 64QAM) require much higher precision math operations compared to smaller constellations (such as 4QAM). Thus, constellation size is reduced, substantial savings in DSP complexity can be realized. Thus, the dynamic optical transceivers 200 can provide exactly what is needed for an application rather than a "one size fits all" approach.

Evolution of the Optical Network—Autonomous Transponders

Rapid network reconfiguration, especially one that supports multiple vendors in the SDN-type open and interoperable environment can benefit from autonomous transceivers. Autonomous transceivers such as the dynamic optical transceivers 200 have the capability to apply sophisticated algorithms independently to identify incoming signal characteristics, such as Baud rate, bit rate, constellation configuration, etc. This can serve as a replacement or a double-check on the controller, and improve network reliability and resilience. Such blind format and channel recognition algorithms are quite complex, but are only required once at start up, but would consume significant resources on a DSP ASIC. The dynamic optical transceivers 200 can utilize an associated DSP app at start up and then disable or delete such an app, including storing it outside of FPGA in local memory which is accessible when needed.

Dynamic Optical Transceivers

Generally, the dynamic optical transceiver 200 is associated with the optical signal which is the result of modulating an electrical signal onto an optical carrier. That electrical signal may have a single carrier such as with a single Time Division Multiplexing (TDM) stream of Quadrature Phase Shift Keying (QPSK) symbols, a plurality of carriers such as with Nyquist Frequency-Division Multiplexing (FDM), or a very large number of carriers such as with Orthogonal Frequency-Division Multiplexing (OFDM). Any type of modulation scheme is contemplated.

In an exemplary embodiment, each dynamic optical transceiver 200 is tunable so that it can selectively generate a wavelength centered at the desired carrier wavelength (or frequency). In exemplary embodiments in which tunable dynamic optical transceivers 200 are used, the wavelength range of each dynamic optical transceiver 200 may be wide enough to enable the dynamic optical transceiver 200 to generate any wavelength in the optical spectrum. In other exemplary embodiments, the wavelength range of each dynamic optical transceiver 200 may be wide enough to enable the modem 200 to generate any one of a subset of wavelengths in the optical spectrum. The dynamic optical transceiver 200 may be configured to use any of duo-binary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. It is understood that for electronic channel discrimination, a tunable Rx is required. In nQAM and nPSK it is achieved using a linear receiver, i.e., a receiver where frequency mixing is taking place between an optical local oscillator and the incoming signal. A Local Oscillator (LO) needs to be tuned to the right frequency such that the mixing product can be at baseband where all the necessary filtering will occur. If a receiver is not operating like above, it requires a tunable optical filter prior to the optical detector.

The dynamic optical transceivers 200 can support various different baud rates through software-programmable modulation formats. The dynamic optical transceivers 200 can support programmable modulation or constellations with both varying phase and/or amplitude. In an exemplary embodiment, the dynamic optical transceivers 200 can support multiple coherent modulation formats such as, for example, i) dual-channel, dual polarization (DP) binary phase-shift keying (BPSK) for 100 G at submarine distances, ii) DP quadrature phase-shift keying (QPSK) for 100 G at ultra-long haul distances, iii) 16-quadrature amplitude modulation (QAM) for 200 G at metro to regional (600 km) distances), or iv) dual-channel 16QAM for 400 G at metro to regional distances. As described herein, in conventional optical transceivers, the same optical transceiver can support 100 G to 400 G due to the use of custom, hard-coded, pre-programmed ASIC implementations with multiple modes. However, with the dynamic optical transceivers 200, each dynamic optical transceiver 200 is loaded with DSP apps on associated FPGA hardware as appropriate for a single mode.

In another exemplary embodiment, the optical transceiver 200 can support N-QAM modulation formats with constellation shaping with and without dual-channel and dual-polarization where N can even be a real number and not necessarily an integer. Here, the optical transceiver 200 can support non-standard speeds since N can be an effective real number as opposed to an integer, i.e. not just 100 G, 200 G, or 400 G, but variable speeds, such as 130 G, 270 G, 560 G, etc. These rates could be integer multiples of 10 Gb/s, or of 1 Gb/s. Furthermore, with the DSP and software programming of the optical transceiver 200, the capacity of the optical transceiver 200 can be adjusted upwards or downwards in a flexible and hitless manner so as not to affect the guaranteed rate. In other exemplary embodiments, the optical transceiver 200 can include hardware which lacks the aforementioned functionality and thus supports a single modulation format/baud rate which cannot be adjusted (but other parameters that can be adjusted for power, spectrum location, etc.). Additionally, the optical transceiver 200 can tune and arbitrarily select spectrum; thus, no optical filters are required. Additionally, the optical transceiver 200 can support various aspects of nonlinear effect mitigation and dispersion compensation (both for chromatic and polarization mode) in the electrical domain via appropriate DSP apps, thus eliminating external dispersion compensation devices, filters, etc. The optical transceiver 200 can also adapt the forward error correction coding that is used including Hard Decision FEC implementations and Soft Decision FEC (SD-FEC), as another technique to trade-off complexity versus noise tolerance.

In general, the bit rate of the service provided by a modem is proportional to the amount of spectrum occupied and is a function of the noise tolerance. The optical transceiver 200 can include coherent receivers which require no optical dispersion compensation or optical filters (multiplexers and demultiplexers). Also, the optical transceiver 200 can support advanced Performance Monitoring (PMs) for feedback such as Bit Error Rate (BER), Polarization Dependent Loss (PDL), Polarization Mode Dispersion (PMD), and the like to provide accurate modeling of optical characteristics. The optical transceiver 200 can include coherent transmitters which can provide spectral shaping allowing for more efficient spectrum use and flexible grid placement. Also, the coherent transmitters support software-selectable modulation format, providing more bits/s/Hz.

Field Programmable Gate Arrays (FPGAs)

An FPGA is an integrated circuit designed to be configured by a customer or a designer after manufacturing, hence "field-programmable." The FPGA configuration is generally specified using a hardware description language (HDL), similar to that used for an ASIC. FPGAs contain an array of programmable logic blocks, and a hierarchy of reconfigurable interconnects that allow the blocks to be "wired together," like many logic gates that can be inter-wired in different configurations. Logic blocks can be configured to perform complex combinational functions or merely simple logic gates like AND and XOR. In most FPGAs, logic blocks also include memory elements, which may be simple flip-flops or complete blocks of memory.

Contemporary field-programmable gate arrays (FPGAs) have large resources of logic gates, look up tables, and RAM blocks to implement complex digital computations which are the DSP apps described herein. FPGAs can be used to implement any logical function that an ASIC could perform. The ability to update the functionality after shipping, partial reconfiguration of a portion of the design and the low NRE costs relative to an ASIC design (notwithstanding the generally higher unit cost due to significantly lower volumes than FPGAs), offer advantages for the dynamic optical transceiver 200. The FPGAs can also have analog features in addition to digital functions. The analog features can include programmable slew rate on each output pin, oscillators, SERDES, analog-to-digital converters (ADCs) and digital-to-analog converters (DACs) with analog signal conditioning blocks.

A recent industry trend to disaggregating functions (i.e. SERDES, ADC, DAC, DSP, etc.) into separate die allows further improvements in optimizing individual functional performance, cost and power consumption. These functions can then be recombined and interconnected using high performance interposers and System-in-Package (SiP) packaging techniques.

Dynamic Optical Transceiver

Figure 3:
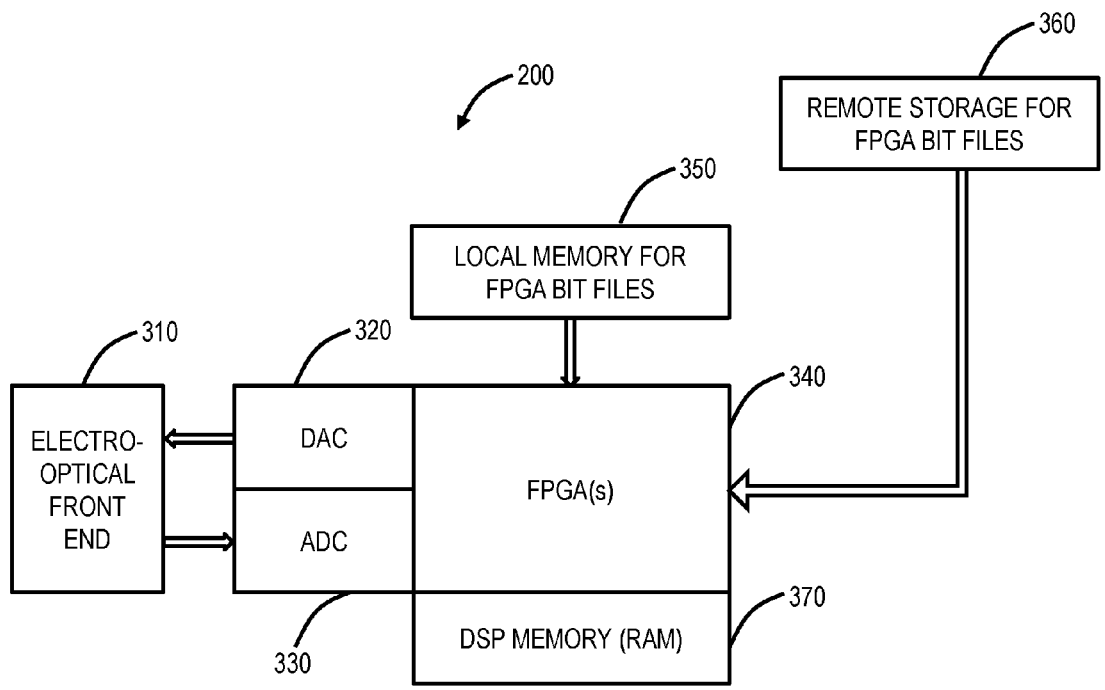
FIG. 3 is a block diagram of functional components of a dynamic optical transceiver.

Referring to FIG. 3, in an exemplary embodiment, a block diagram illustrates functional components of the dynamic optical transceiver 200. The dynamic optical transceiver 200 is an integrated hardware device that may be realized as a line card, line module, pluggable module, blade, daughter board, etc. The integrated hardware device includes a form-factor for operation in or with the switches 122, the network elements 124 or the like. Functional components of the dynamic optical transceiver 200 include an electro-optical front end 310, a digital-to-analog converter (DAC) 320, an analog-to-digital converter (ADC) 330, one or more FPGAs 340, and local memory 350 for storing associated FPGA bit files for DSP apps. Additionally, a system that utilizes the dynamic optical transceiver 200 can also include remote storage 360 for FPGA bit files for remotely providing DSP apps to the dynamic optical transceiver 200. The dynamic optical transceiver 200 can also include local DSP memory 370 integrated with or communicatively coupled to the FPGA 340. The local DSP memory 370 can be DRAM or the like and can be used to store data for various functions associated with the FPGA 340 or the other components in the dynamic optical transceiver 200. The electro-optical front end 310 provides conversion between optical and electronic domains. The ADC 320 and the DAC 330 provide conversion between analog electrical signals and digital domain and are connected to the FPGAs 340 for digital signal processing functions. DRAM memory 370 provides storage for internal DSP functions. The FPGAs 340 are further connected to the local memory 350 for access to bit files (DSP apps) that are either frequently used or require low latency for fast start-up.

The electro-optical front end 310 includes a transmitter and a receiver. The transmitter generally includes a laser and a modulator. The transmitter is configured to receive a transmit signal from the DAC 320 in analog form to drive the modulator to transmit optically the transmit signal. The receiver can include various detectors, a local oscillator (LO), and polarization components. The receiver receives a receive signal optically, performs detection of an electrical signal, and provides an electrical analog signal to the ADC 330 for digital conversion thereof.

The FPGAs 340 are configured to utilize various DSP apps to program FPGA hardware to adapt signals to form the transmit signal which is digitally provided to the DAC 320 and decode the receive signal which is digitally provided from the ADC 330. In some exemplary embodiments, the DAC 320 and the ADC 330 are formed with the FPGAs 340 and in other exemplary embodiments, the DAC 320 and the ADC 330 are separate from the FPGAs 340. With the FPGAs 340, a fiber-optic network control plane or SDN controller is supplied with a set of pre-developed DSP firmware bit files (DSPs apps) that implement single-function and highly optimized DSP code (DSP apps). Again, these are provided to the FPGAs 340 via either the local memory 350, the remote storage 360, or via the local memory 350 from the remote storage 360. Depending on the requested operation mode change, the control plane or SDN controller would determine which DSP apps need to be dynamically loaded into the FPGAs 340, how to pre-load local and remote memories, etc. thereby providing real-time control and configuration. For example, an autonomous signal identification app may be located in the local memory 350. The remote memory 360 is also provided for storing bit files (DSP apps) that are infrequently used and can tolerate loading delays, such as apps related to a specific operating mode which is used at start-up. Also, the local DSP memory 370 can be used to store data for various functions associated with the FPGA 340 or the other components in the dynamic optical transceiver 200, such as signal capture for a blind channel identification function, filter parameters for a dispersion compensation function, or the like.

Currently, there is a fortunate confluence of several technologies which enable the dynamic optical transceiver 200. First, the FPGAs 340 are becoming quite large. Second, advanced interposer technologies enable placement of multiple FPGA dies in close proximity, and further coupling other functions such as the ADC 330, the DAC 320, and the memory 350 across very dense low-power interfaces. Third, the FPGAs 340 are high volume devices, and generally have access to one or sometimes two CMOS nodes more advanced than ASICs. For example, current ASIC development is at 28 nm, while FPGAs 340 are shipping in 16 nm FinFET+ as of Q3 2015. There are already plans for the FPGAs 340 in 7 nm CMOS.

Given the trajectory of the FPGA 340 performance improvement, the highly performant algorithms of the DSP apps fit into the implementation. As an example, chromatic dispersion (CD) compensation is one of the largest functional blocks. An example of an FPGA-based CD compensation technique is described in commonly-assigned U.S. Pat. No. 8,884,649 issued Nov. 11, 2014, and entitled "SYSTEM AND METHOD FOR STATIONARY FINITE IMPULSE RESPONSE FILTERS IN PROGRAMMABLE MICROELECTRONIC CIRCUITS," the contents of which are incorporated by reference. This has been implemented in a Xilinx Virtex-7 FPGA covering 2000 km using less than 30% of the FPGA 340 resources.

The other large block is an FEC decoder. It is possible that some highly complex soft-decision decoders may not fit into an FPGA implementation of reasonable size. However, the same codes may usually be decoded using efficient hard-decision approaches, albeit at some coding gain penalty. Further, industry standards for interoperable transceivers are focused exclusively on compact hard decision decoders.

There are also efficient implementations for other functional blocks, such as polarization tracking, PMD compensation, clock and carrier frequency recovery, etc. Again, as described herein, the functional blocks are realized based on DSP apps (bit files) which describe the appropriate FPGA configuration for the functional blocks.

The DSP apps, i.e., the bit files, may also be partitioned into smaller functional blocks, such that only blocks that are different between operating modes may be replaced. Also, even smaller DSP app chunks are contemplated, such as a Fast Fourier Transform (FFT) app, an Inverse FFT (IFFT) app, etc. Precise partitioning depends on the FPGA 340 capability and dynamic optical transceiver 200 architecture.

For example, a transceiver 200 that just entered auto start mode can be loaded with an image that provides data capture, automatic baud rate and modulation format identification, and identification of major channel parameters such as accumulated chromatic dispersion. Once done, the start-up image is removed and an image appropriate for the modulation and channel characteristics can be loaded.

Another example may be when a transceiver 200 is requested to switch between a mode proprietary to a vendor implementation to one compatible with a standard specification. The switch may be made by switching the decoding block to differential detection, removing cycle slip identification, replacing FEC with compatible encoder and decoder blocks, etc.

A final example may be a transceiver 200 that is requested to switch from a high bit rate (e.g., 32QAM), short work path to a much longer optical protection path that can only operate at a lower bit rate (e.g., 4QAM). Such a change may be the result of a protection switch. In this case, most of the front-end DSP processing can be replaced with bit files supporting processing with lower resolution math, but possibly requiring a much longer chromatic dispersion filter and the FEC block may stay the same.

Of course, those of ordinary skill in the art will recognize there are various examples and combinations of FPGA 340 configuration for any application of the dynamic optical transceivers 200 ranging from extremely short-reach Data Center interconnection applications, to metro network deployments (e.g., up to 80 km), to regional network deployments (e.g., 80-300 km), to long-haul (e.g., up to 2000 km and beyond), and up to submarine deployments.

With respect to the FPGAs 340, the cost per transistor has recently inverted (i.e., smaller CMOS nodes are actually more expensive per transistor than older larger nodes), which makes low volume ASIC production even more problematic going forward. At the same time, FPGAs are high volume, generic devices, and plans for scaling down to 7 nm node are already under way. The current semiconductor industry model is moving away from highly integrated single die devices, and more into disaggregated functions on separate high performance die. Sophisticated interposer-based packaging overcomes cost issues and provides high bandwidth low power interconnect capability. Also, integration of high-performance DAC 320 and ADC 330 functions with a programmable FPGA 340 backend is enabled by high-performance interposers and low power digital interfaces. The continued FPGA 340, ADC 330, and DAC 320 evolution will allow increasing support, but will still provide full back compatibility to deployed transceivers 200 through separately downloadable images. Spectral sliced bandwidth variable transceivers 200 can be more optimally supported by having DSP images tailored to a specific format. The savings should be particularly large when the transceiver 200 is operating at both lower Baud rate and lower bit rate.

DSP Applications

The following is a non-limiting list of possible DSP applications that can be loaded on the dynamic optical transceiver 200. Note, the FPGAs 340 can utilize multiple applications in various configurations as needed. It is expected that the transceivers 200 will also include management tools for loading the DSP apps from the local memory 350 and the remote storage 360, in the proper order and configuration. Also, each of the following DSP applications could have different variants for different applications such as data center, metro, regional, long-haul, and submarine applications.

| DSP app | Functionality |
| --- | --- |
| FEC encoding | FPGA configuration to provide encoding of FEC on a signal. There can be multiple apps for different FEC schemes, where a specific FEC scheme is selected based on the optical application or standard compliance requirement. For example, submarine applications may use stronger FEC codes than metro applications, etc. Some standards may require codes such as Reed-Solomon or Low-Density Parity Check, etc. |
| FEC decoding | FPGA configuration to provide decoding of FEC on a signal. A decoding scheme has to be matched to the encoding. Further, different decoders may be applied to the same encoding scheme. For example, decoders could be hard or soft decision, etc. |
| Signal Interleaving/Deinterleaving | This function is used to provide improved resilience and immunity to correlated block errors. If the channel errors corrupt multiple consecutive bits, receiver based deinterleaver randomizes their distribution before FEC decoding. |
| Encryption and Key Management | Data can be encrypted prior to transmission, and decrypted on reception. Corresponding key management functions have to be provided. |
| Training Sequence Insertion and Detection | Transmitted signal demodulation robustness can be improved by the periodic insertion of known training sequences to the transmitted signal. Receiver then checks and optimizes its demodulation/decoding algorithm operation against these known sequences. |
| Performance Monitoring | Variously listed blocks can provide channel condition, impairment and noise information that can be valuable to the end user. This information can be collected, aggregated, and made available to the user through a User Interface. |
| User Interface | Supports protocols for exchanging information with the user, including configuration, performance, channel conditions, etc. |

| DSP app | Functionality |
| --- | --- |
| Chromatic Dispersion equalization | FPGA configuration to provide chromatic dispersion compensation including filtering such as Finite Impulse Response (FIR) filters to adaptively equalize a signal. |
| PMD equalization | FPGA configuration to provide electrical domain filtering of polarization dependent transients. |
| Modulation format | FPGA configuration for implementing a coherent modulation scheme to process received signal for proper modulation of the electro-optical front end. |
| Non-linear compensation | FPGA configuration for non-linear effect compensation in the electrical domain, including Cross-Phase Modulation (XPM), Self-Phase Modulation (SPM), Four-Wave Mixing (FWM), cross-talk, etc. Can be performed via pre-distortion, post-distortion, or pre and post-distortion in combination. |
| Spectral slicing | FPGA configuration for electrical domain implementations of spectral slicing. |
| Framing | FPGA configuration to implement signal framing/de-framing with overhead on a signal. The framing can include proprietary vendor-specific framing as well as any standardized framing technique such as OTN, SONET, SDH, Ethernet, etc. |
| Coherent Detection | FPGA configuration to compute decision variables based on recovery of a full electric field with amplitude and phase information. |
| De-skew and orthonormalization | FPGA configuration for alignment of in-phase and quadrature components or polarized channel components and ensuring independence or decorrelation between channels. |
| Timing recovery | FPGA configuration for recovery timing from a signal. |
| Frequency estimation | FPGA configuration for estimating frequency from a signal. |
| Carrier phase estimation and correction | FPGA configuration to track carrier phase on a signal and correct accordingly. |
| Symbol estimation and decoding | FPGA configuration to estimate and decode symbols on a signal. |
| Packet processing | FPGA configuration to perform any level of packet processing in the dynamic optical transceiver. |
| Performance monitoring | FPGA configuration to perform PM monitoring between adjacent dynamic optical transceivers. The PM scheme can be standards-based and/or proprietary. |
| PRBS generation | FPGA configuration to provide pseudorandom binary sequence (PRBS) generation for testing, etc. |
| Filtering | FPGA configuration to provide any type of electrical domain filtering. These apps can be finer granularity and used with any of these other apps described herein. |
| Integrated ADC/DAC | FPGA configuration for integrated ADC/DAC. |
| MLSE | FPGA configuration to implement Maximum likelihood sequence estimation (MLSE). |
| Blind recovery | FPGA configuration to implement blind signal recovery between two dynamic optical transceivers. |
| Channel recognition | FPGA configuration to recognize a channel (modulation format, bit rate, baud rate, etc.) between two dynamic optical transceivers. |
| SERDES | FPGA configuration to implement Serializer/Deserializer (SERDES) functionality in the dynamic optical transceivers. |
| Carrier synchronization | FPGA configuration for a Feed Forward (FF) carrier synchronization to estimate carrier phase. |
| IFFT/FFT | FPGA configuration for a much finer granular application to perform a specific Inverse Fast Fourier Transfer (IFFT) and FFT. This may be used in any of the above. |

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A software programmable optical transceiver, comprising:
   one or more Field Programmable Gate Arrays (FPGAs); and
   an electro-optical front end communicatively coupled to the one or more FPGAs, wherein the electro-optical front end comprises a transmitter and a receiver, wherein the transmitter is adapted to transmit a transmit signal from the one or more FPGAs and the receiver is adapted to receive a receive signal and provide the receive signal to the one or more FPGAs,
   wherein one or more applications are utilized to dynamically configure the one or more FPGAs for digital functionality to operate the software programmable optical transceiver in an associated mode of a plurality of modes, the plurality of modes comprising a Data Center interconnect mode, a metro mode, a regional mode, a long-haul mode, and a submarine mode, each of said plurality of modes requiring different digital functionality based in part on distance, wherein the one or more applications for the associated mode are loaded in the one or more FPGAs as needed such that the software programmable optical transceiver is configured to operate in any one of the plurality of modes with only the one or more applications loaded for the associated mode.

2. The software programmable optical transceiver of claim 1, wherein the one or more applications are loaded to configure the software programmable optical transceiver in another mode, without requiring pre-programmed hardware in the software programmable optical transceiver for operation in a plurality of operating modes.

3. The software programmable optical transceiver of claim 1, wherein the one or more applications are FPGA bit files adapted to configure the one or more FPGAs.

4. The software programmable optical transceiver of claim 1, wherein the one or more applications are loaded from one of a local memory in the software programmable optical transceiver and remote storage communicatively coupled to the software programmable optical transceiver.

5. The software programmable optical transceiver of claim 1, wherein, when the softllware programmable optical transceiver is in a startup mode, the one or more applications comprise automatic identification of baud rate, modulation format, and channel operating parameters, and
   wherein, subsequent to the startup mode, the one or more applications comprise applications for identified modulation and channel operating parameters.

6. The software programmable optical transceiver of claim 1, wherein the one or more applications comprise a plurality of proprietary applications for single vendor interoperability and a plurality of standards-based applications for multi-vendor interoperability.

7. The software programmable optical transceiver of claim 1, wherein the one or more FPGAs are updated with different applications of the one or more applications responsive to a protection switch causing different operating conditions.

8. The software programmable optical transceiver of claim 1, further comprising, between the one or more FPGAs and the electro-optical front end:
   a digital-to-analog converter (DAC) adapted to receive digitally the transmit signal from the one or more FPGAs; and
   an analog-to-digital converter (ADC) adapted to transmit digitally the receive signal to the one or more FPGAs.

9. The software programmable optical transceiver of claim 8, wherein the DAC and the ADC are integrated with the one or more FPGAs via interposers and low power digital interfaces.

10. The software programmable optical transceiver of claim 1, wherein the one or more applications are loaded to the one or more FPGAs through based on control through one or more of a control plane and a Software Defined Network (SDN) controller.

11. The software programmable optical transceiver of claim 1, wherein the electro-optical front end utilizes coherent modulation and demodulation, and the one or more applications support the digital functionality associated with the coherent modulation and demodulation.

12. The software programmable optical transceiver of claim 1, wherein the one or more applications support the digital functionality associated with optical signal compensation comprising one or more of Forward Error Correction (FEC), dispersion compensation, Polarization Mode Dispersion (PMD), and non-linear effect compensation.

13. A software programmable optical transceiver, comprising:
   an electro-optical front end for conversion between an optical domain and an electrical domain;
   a digital-to-analog converter (DAC) and an analog-to-digital converter (ADC) for conversion between analog electrical signals and digital electrical signal; and
   one or more Field Programmable Gate Arrays (FPGAs) for digital signal processing functions,
   wherein one or more applications are utilized to dynamically configure the one or more FPGAs for the digital signal processing functions to operate the software programmable optical transceiver in an associated mode of a plurality of modes, the plurality of modes comprising a Data Center interconnect mode, a metro mode, a regional mode, a long-haul mode, and a submarine mode, each of said plurality of modes requiring different digital functionality based in part on distance, wherein the one or more applications for the associated mode are loaded in the one or more FPGAs as needed such that the software programmable optical transceiver is configured to operate in any one of the plurality of modes with only the one or more applications loaded for the associated mode.

14. The software programmable optical transceiver of claim 13, wherein the one or more applications are loaded to configure the software programmable optical transceiver in another mode, without requiring pre-programmed hardware in the software programmable optical transceiver for operation in a plurality of operating modes.

15. The software programmable optical transceiver of claim 13, wherein, when the software programmable optical transceiver is in a startup mode, the one or more applications comprise identification of baud rate, modulation format, and channel operating parameters, and
  wherein, subsequent to the startup mode, the one or more applications comprise applications for identified modulation and channel operating parameters.

16. A method implemented through a software programmable optical transceiver comprising one or more Field Programmable Gate Arrays (FPGAs), the method comprising:
  responsive to a startup mode, loading one or more applications for automatic identification of baud rate, modulation format, and channel operating parameters into the one or more FPGAs; and
  subsequent to the startup mode, loading applications into the one or more FPGAs for identified modulation and channel operating parameters,
  wherein the one or more applications for an associated mode of a plurality of modes, the plurality of modes comprising a Data Center interconnect mode, a metro mode, a regional mode, a long-haul mode, and a submarine mode, each of said plurality of modes requiring different digital functionality based in part on distance-are loaded in the one or more FPGAs as needed such that the software programmable optical transceiver is configured to operate in any one of the plurality of modes with only the one or more applications loaded for the associated mode.

17. The method of claim 16, wherein the one or more applications are loaded to configure the software programmable optical transceiver in another mode, without requiring pre-programmed hardware in the software programmable optical transceiver for operation in a plurality of operating modes.

18. The software programmable optical transceiver of claim 1, wherein the one or more applications comprise pre-loaded applications in the one or more FPGAs and remote applications which are downloaded to the one or more FPGAs based on determinations by the pre-loaded applications.

19. The software programmable optical transceiver of claim 18, wherein the one or more of the pre-loaded applications are deleted from the one or more FPGAs subsequent to start up.

* * * * *